United States Patent
Chung et al.

(10) Patent No.: US 9,695,350 B2
(45) Date of Patent: Jul. 4, 2017

(54) AMPHOLYTE POLYMERIC COMPOUNDS IN SUBTERRANEAN APPLICATIONS

(71) Applicant: Halliburton Energy Services, Inc., Houston, TX (US)

(72) Inventors: HsinChen Chung, Houston, TX (US); Yuntao Thomas Hu, The Woodlands, TX (US); Xiangnan Ye, Cypress, TX (US); Narongsak Tonmukayakul, Spring, TX (US); Michael A. McCabe, Duncan, OK (US); Kevin Walter Frederick, Evans City, PA (US); Shih-Ruey Tom Chen, Pittsburgh, PA (US); Randy Jack Loeffler, Carnegie, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 275 days.

(21) Appl. No.: 13/929,871

(22) Filed: Jun. 28, 2013

(65) Prior Publication Data
US 2014/0352962 A1    Dec. 4, 2014

Related U.S. Application Data

(60) Provisional application No. 61/829,609, filed on May 31, 2013.

(51) Int. Cl.
*E21B 43/26* (2006.01)
*C09K 8/12* (2006.01)
(Continued)

(52) U.S. Cl.
CPC .............. *C09K 8/12* (2013.01); *C04B 24/163* (2013.01); *C04B 28/02* (2013.01); *C09K 8/035* (2013.01);
(Continued)

(58) Field of Classification Search
CPC ............................ C09K 8/588; C09K 2208/28
See application file for complete search history.

(56) References Cited

U.S. PATENT DOCUMENTS

| 4,225,445 A | 9/1980 | Dixon |
| 4,330,450 A * | 5/1982 | Lipowski .................. C02F 1/54 |
| | | 162/168.1 |

(Continued)

FOREIGN PATENT DOCUMENTS

| CN | 101429427 | 5/2009 |
| WO | 01/06999 | 2/2001 |
| WO | 01-06999 A1 | 2/2001 |

OTHER PUBLICATIONS

International Search Report and Written Opinion for PCT/US2014/039570 dated Sep. 18, 2014.

(Continued)

*Primary Examiner* — Angela M DiTrani
*Assistant Examiner* — Andrew H Sue-Ako
(74) *Attorney, Agent, or Firm* — McDermott Will & Emery LLP

(57) ABSTRACT

Ampholyte polymeric compounds that comprise at least one nonionic monomer, at least one sulfonic acid-containing monomer, and at least one cationic monomer may be useful as friction reducing agents in treatment fluids for use in subterranean operations at a concentration of about 0.001 v/v % to about 0.5 v/v % of the treatment fluid. Such operations may involve introducing the treatment fluid into a wellbore penetrating a subterranean formation optionally at a rate and/or a pressure sufficient to create or extend at least one fracture in the subterranean formation.

14 Claims, 5 Drawing Sheets

(51) Int. Cl.
*C09K 8/588* (2006.01)
*E21B 43/16* (2006.01)
*C09K 8/36* (2006.01)
*C09K 8/64* (2006.01)
*C09K 8/82* (2006.01)
*C09K 8/68* (2006.01)
*C09K 8/72* (2006.01)
*C09K 8/88* (2006.01)
*C04B 24/16* (2006.01)
*C04B 28/02* (2006.01)
*C09K 8/035* (2006.01)
*C09K 8/42* (2006.01)
*C09K 8/467* (2006.01)
*C09K 8/512* (2006.01)
*C09K 8/52* (2006.01)
*C09K 8/62* (2006.01)
*C09K 8/80* (2006.01)
*C09K 8/74* (2006.01)
*C09K 8/76* (2006.01)
*C04B 103/00* (2006.01)

(52) U.S. Cl.
CPC .................. *C09K 8/36* (2013.01); *C09K 8/42* (2013.01); *C09K 8/467* (2013.01); *C09K 8/512* (2013.01); *C09K 8/52* (2013.01); *C09K 8/588* (2013.01); *C09K 8/62* (2013.01); *C09K 8/64* (2013.01); *C09K 8/68* (2013.01); *C09K 8/725* (2013.01); *C09K 8/74* (2013.01); *C09K 8/76* (2013.01); *C09K 8/80* (2013.01); *C09K 8/82* (2013.01); *C09K 8/882* (2013.01); *C09K 8/887* (2013.01); *E21B 43/16* (2013.01); *E21B 43/26* (2013.01); *C04B 2103/0062* (2013.01); *C09K 2208/28* (2013.01)

(56) References Cited

U.S. PATENT DOCUMENTS

| | | | |
|---|---|---|---|
| 4,460,627 A | 7/1984 | Weaver et al. | |
| 4,484,631 A | 11/1984 | Sherwood et al. | |
| 4,726,906 A | 2/1988 | Chen et al. | |
| 4,959,432 A | 9/1990 | Fan et al. | |
| 4,982,793 A | 1/1991 | Holtmyer et al. | |
| 5,032,295 A | 7/1991 | Matz et al. | |
| 5,067,565 A | 11/1991 | Holtmyer et al. | |
| 5,122,549 A | 6/1992 | Holtmyer et al. | |
| 5,322,640 A * | 6/1994 | Byrne | C23F 11/149 252/389.22 |
| 5,609,862 A | 3/1997 | Chen et al. | |
| 5,879,670 A | 3/1999 | Melby et al. | |
| 6,281,172 B1 | 8/2001 | Warren et al. | |
| 6,482,776 B1 * | 11/2002 | Matz | C04B 24/163 162/168.2 |
| 7,004,254 B1 | 2/2006 | Chatterji et al. | |
| 7,271,134 B2 | 9/2007 | King et al. | |
| 7,427,583 B2 | 9/2008 | Couillet et al. | |
| 7,482,310 B1 | 1/2009 | Reese et al. | |
| 7,579,302 B2 | 8/2009 | McMechan et al. | |
| 2003/0008779 A1 * | 1/2003 | Chen | A61K 8/8158 507/200 |
| 2003/0155122 A1 | 8/2003 | Chang et al. | |
| 2004/0040708 A1 * | 3/2004 | Stephenson | C09K 8/805 166/280.1 |
| 2009/0050320 A1 | 2/2009 | Collins et al. | |
| 2009/0105097 A1 | 4/2009 | Abad et al. | |
| 2009/0209438 A1 * | 8/2009 | Thieme | C09K 8/602 507/219 |
| 2010/0230106 A1 * | 9/2010 | Milne | C09K 8/5083 166/307 |
| 2010/0307752 A1 * | 12/2010 | Rey | C09K 8/68 166/305.1 |
| 2014/0352962 A1 | 12/2014 | Chung et al. | |
| 2014/0352969 A1 | 12/2014 | Chung et al. | |
| 2014/0367108 A1 | 12/2014 | Chung et al. | |

OTHER PUBLICATIONS

International Search Report and Written Opinion for PCT/US2014/039368 dated Oct. 8, 2014.

Office Action received in corresponding Polish Application No. P-414671, dated Mar. 26, 2016.

Office Action received in corresponding Polish Application No. P-414670, dated Mar. 26, 2016.

* cited by examiner

AMPHOLYTE POLYMERIC COMPOUNDS IN SUBTERRANEAN APPLICATIONS

CROSS-REFERENCE TO RELATED APPLICATIONS

This application claims priority to U.S. Provisional Patent Application No. 61/829,609 filed May 31, 2013 entitled "Ampholyte Polymeric Compounds in Subterranean Applications."

BACKGROUND

At least some of the exemplary embodiments described herein relate to methods of using ampholyte polymeric compounds as friction reducing agents in subterranean operations, and treatment fluid compositions relating thereto.

During the drilling, completion, and stimulation of wellbores and subterranean formations, aqueous treatment fluids are often pumped through tubular goods (e.g., pipes, coiled tubing, etc.). A considerable amount of energy may be lost due to friction between the aqueous treatment fluid in turbulent flow and the formation, the wellbore, and/or the tubular goods located within the wellbore. As a result of these energy losses, additional horsepower may be necessary to achieve the desired treatment.

For example, in fracturing operations, a treatment fluid utilizes either an increased viscosity (e.g., a gelled fluid) or a high flow rate (e.g., a high-rate water) to create or extend one or more factures in the formation. As the treatment fluid flows across the surfaces in the formation, the wellbore, and related tubular goods, the frictional forces between the treatment fluid and surfaces are amplified relative to non-viscosified fluids under normal flow because of the increased viscosity or high flow rate of the treatment fluid. The amplified friction forces translate to a need for increasing the energy input to achieve the desired pressure and/or flow rate for the treatment fluid. Increasing energy input increases the cost of the fracturing operation.

To reduce these energy losses, friction reducing agents are in aqueous treatment fluids. However, most of the friction reducing agents are sensitive to the total dissolved solids of the local environment (e.g., either the treatment fluid or the formation fluids encountered during an operation). As used herein, total dissolved solids ("TDS") refers to the sum of all minerals, metals, cations, and anions dissolved in water, which is differentiated from suspended solids and can be separated from suspended solids via filtration. As most of the dissolved solids are typically salts, the amount of salt in water is often described by the concentration of total dissolved solids in the water. As the TDS increases, many friction reducing agents loose function and, in some instances, may further aggravate the situation by precipitating out of the fluid.

Further, in some instances, it is desirable for the friction reducing agent to reduce the friction in the wellbore and near-wellbore areas and degrade or break at some time thereafter. To achieve this with traditional friction reducing agents, the breaker may be included in the treatment fluid, or a breaking fluid may be subsequently introduced, the latter of which increases the complexity, cost, and time associated with subterranean operations. In instances where breakers are included in the initial treatment fluid, the breakers are generally engineered to delay breaking (e.g., via encapsulation or chemical modification), which increases the cost of developing and producing the delayed breaker.

Recently, improved friction reducing systems have been developed that are multi-component systems and less sensitive to the TDS. However, implementation of these friction-reducing systems at the well site typically involves metering each component into the treatment fluid at different rates, which increases the complexity of the operations. Variations in the formulation of the friction reducing systems as a result of improper metering can result in a less effective, or ineffective, friction reduction, which in turn increases the energy requirements and costs of the operation.

Accordingly, a need exists for a friction reducing agent that is compatible with environments having higher TDS, and that are less complex to implement, preferably single-component.

BRIEF DESCRIPTION OF THE DRAWINGS

The following figures are included to illustrate certain aspects of the exemplary embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
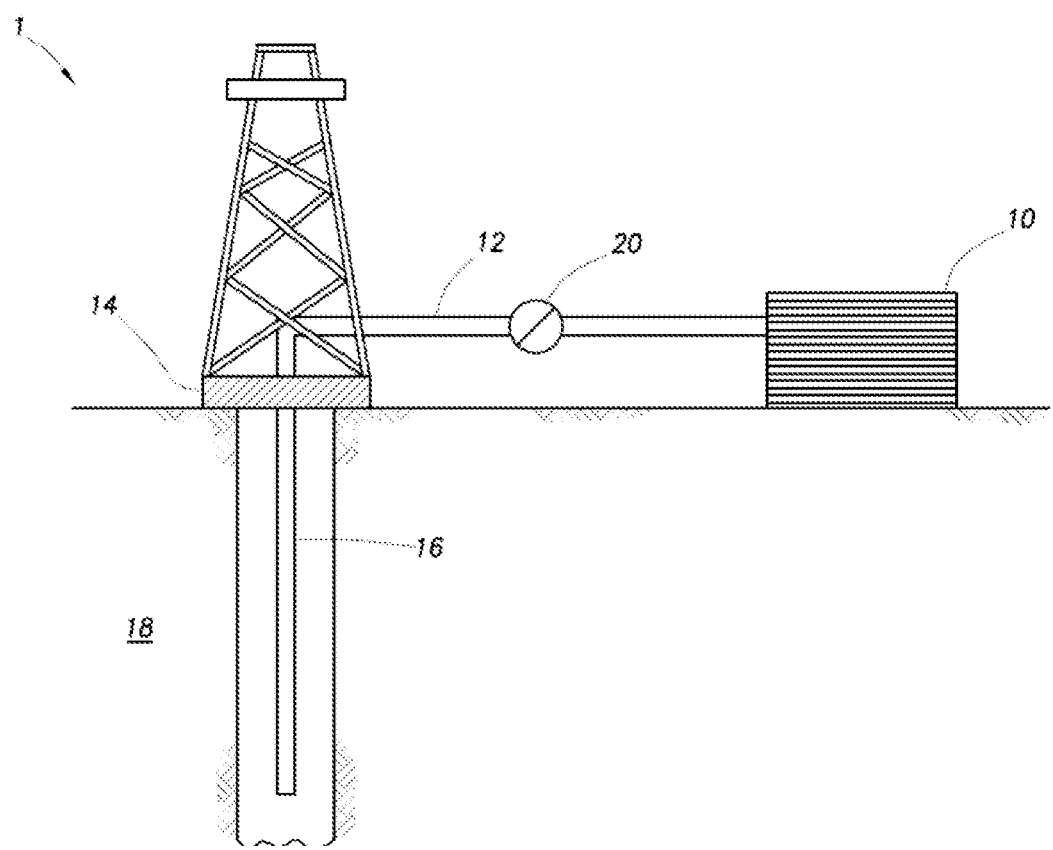
FIG. 1 provides an illustrative schematic of a system that can deliver treatment fluids of the present invention to a downhole location.

At least some of the exemplary embodiments described herein relate to methods of using ampholyte polymeric compounds as friction reducing agents in subterranean operations, and treatment fluid compositions relating thereto.

As used herein, the term "ampholyte" refers to a compound having both a positive and a negative charge. The ampholyte polymeric compounds described herein include nonionic monomers, cationic monomers, and sulfonic acid-containing monomers.

The ampholyte polymeric compounds described herein are suitable for friction reduction in treatment fluids, including in high TDS treatment fluids (e.g., treatment fluids with saltwater or brackish water base fluids). Further, the ampholyte polymeric compounds described herein advantageously provide for single-component friction reduction agents that reduce implementation complexity as compared to the multi-component friction reducing systems described above. Together, these properties and advantages synergistically provide for friction reducing agents enhance operational efficacy, reduce the energy requirement, and reduce the cost of the treatment.

Further, the ampholyte polymeric compounds described herein may advantageously break over time with the use of little or no breaker. Without being limited by theory, it is believed that, at least some of the monomeric units of the ampholyte polymeric compounds may at least partially hydrolyze, which in turn may cause the ampholyte polymeric compound to contract and reduce its friction reducing effect. As used herein, the terms "partially hydrolyze," "partially hydrolysis," and the like refer to hydrolysis of at least some of the monomeric units of a polymeric compound (e.g., ampholyte polymeric compounds described herein). Partial hydrolysis and polymeric contraction of an ampholyte polymeric compound described herein may advantageously allow wellbore operations to be performed with minimal amounts of breaker in the treatment fluid and/or without the need for a subsequent breaking treatment (and perhaps in some instances, without any breaker or need for subsequent breaking treatments), which reduces the cost and time associated with the wellbore operations.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

The treatment fluids described herein comprise a base fluid and an ampholyte polymeric compound.

Ampholyte polymeric compounds suitable for use in conjunction with the treatment fluids and methods described herein may include at least one nonionic monomer, at least one cationic monomer, and at least one sulfonic acid-containing monomer.

Suitable nonionic monomers may include, but are not limited to, acrylamide. In some embodiments, the ampholyte polymeric compounds described herein may include nonionic monomers in an amount ranging from a lower limit of about 30%, 33%, 35%, or 40% by weight of the ampholyte polymeric compound to an upper limit of about 50%, 47%, 45%, or 40% by weight of the ampholyte polymeric compound, and wherein the amount of nonionic monomer may range from any lower limit to any upper limit and encompasses any subset therebetween.

Suitable sulfonic acid-containing monomers may include, but are not limited to, 2-acrylamido-2-methylpropane sulfonic acid, a salt thereof (e.g., the sodium salt of 2-acrylamido-2-methylpropane sulfonic acid), and any combination thereof. In some embodiments, the ampholyte polymeric compounds described herein may include sulfonic acid-containing monomers in an amount ranging from a lower limit of about 5%, 6%, 8%, or 10% by weight of the ampholyte polymeric compound to an upper limit of about 15%, 14%, 12%, or 10% by weight of the ampholyte polymeric compound, and wherein the amount of sulfonic acid-containing monomer may range from any lower limit to any upper limit and encompasses any subset therebetween.

Suitable cationic monomers may include, but are not limited to, acryloyloxy ethyl trimethyl ammonium chloride, methacrylamidopropyltrimethyl ammonium chloride, and any combination thereof. In some embodiments, the ampholyte polymeric compounds described herein may include cationic monomers in an amount ranging from a lower limit of about 40%, 42%, 45%, or 50% by weight of the ampholyte polymeric compound to an upper limit of about 60%, 57%, 55%, or 50% by weight of the ampholyte polymeric compound, and wherein the amount of cationic monomer may range from any lower limit to any upper limit and encompasses any subset therebetween.

In some embodiments, the ampholyte polymeric compounds described herein may have a weight average molecular weight ranging from a lower limit of about 2,000,000, 5,000,000, or 10,000,000 to an upper limit of about 20,000,000, 15,000,000, or 10,000,000, and wherein the weight average molecular weight may range from any lower limit to any upper limit and encompasses any subset therebetween. Those of ordinary skill in the art will recognize that ampholyte polymeric compounds having molecular weights outside the listed range may be suitable as friction reducing agents in treatment fluids described herein.

In some embodiments, the ampholyte polymeric compounds may be included in the treatment fluid in an amount ranging from a lower limit of about 0.001 v/v %, 0.0025 v/v %, 0.005 v/v %, 0.01 v/v %, 0.05 v/v %, or 0.1 v/v % of the ampholyte polymeric compounds to the aqueous portion of the treatment fluid to an upper limit of about 0.5 v/v %, 0.25 v/v %, 0.15 v/v %, or 0.1 v/v % of the ampholyte polymeric compounds to the treatment fluid, and wherein the concentration may range from any lower limit to any upper limit and encompasses any subset therebetween. One skilled in the art with the benefit of this disclosure should recognize that the concentration of the ampholyte polymeric compounds may depend on, inter alia, the composition of the ampholyte polymeric compounds, the molecular weight of the ampholyte polymeric compounds, the composition of the base fluid, the other components of the treatment fluid (e.g., inclusion of a gelling agent or gas with foaming agent), the TDS of the treatment fluid, and the like, and any combination thereof.

Suitable base fluids for use in conjunction with the methods described herein may include, but not be limited to, aqueous-based fluids or oil-in-water emulsions, wherein the ampholyte polymeric compound is in the aqueous portion of the base fluid.

Suitable aqueous-based fluids (or water phases of an emulsion) may include fresh water, saltwater (e.g., water containing one or more salts dissolved therein), brine (e.g., saturated salt water), seawater, and any combination thereof. In some embodiments, the aqueous-based fluid may further comprise aqueous-miscible fluids, which may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, and any combination thereof. One of ordinary skill in the art, with the benefit of this disclosure, should recognize that higher concentrations of some aqueous-miscible fluids may cause the ampholyte polymeric compound described herein to precipitate or flocculate. As such, aqueous-miscible fluids may, in some embodiments, be included in the treatment fluids described herein at a low concentration.

Suitable oil phases for an oil-in-water emulsion may include, but are not limited to, an alkane, an olefin, an aromatic organic compound, a cyclic alkane, a paraffin, a diesel fluid, a mineral oil, a desulfurized hydrogenated kerosene, and any combination thereof.

The treatment fluids described herein may, in some instances, be foamed. As used herein the term "foam" refers to a two-phase composition having a continuous liquid phase and a discontinuous gas phase. In some embodiments, the treatment fluids described herein may comprise a base fluid, a gas, a foaming agent, and an ampholyte polymeric compound.

Suitable gases may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 lb of proppant per gal of treatment fluid.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompasses any subset therebetween. Most preferably, the foamed treatment fluid may have a foam quality from about 85% to about 95%, or about 90% to about 95%.

Suitable foaming agents may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quarternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in treatment fluids at concentrations ranging typically from about 0.05% to about 2% of the liquid component by weight (e.g., from about 0.5 to about 20 gallons per 1000 gallons of liquid).

The treatment fluids described herein may, in some instances, be gelled. In some embodiments, the treatment fluids described herein may comprise a base fluid, a gelling agent, and an ampholyte polymeric compound.

Suitable gelling agents may comprise any substance (e.g., a polymeric material) capable of increasing the viscosity of the treatment fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents, synthetic gelling agents, or a combination thereof. The gelling agents also may be cationic gelling agents, anionic gelling agents, or a combination thereof. Suitable gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose ("CMC"), and carboxymethylhydroxyethylcellulose), xanthan, scleroglucan, succinoglycan, diutan, and combinations thereof. In certain embodiments, the gelling agents comprise an organic carboxylated polymer, such as CMHPG.

Suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacry late, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer, such as those disclosed in U.S. Pat. Nos. 4,982,793, 5,067,565, and 5,122,549, the entire disclosures of which are incorporated herein by reference.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids described herein in an amount sufficient to provide the desired viscosity while not exceeding a concentration that quenches the advantages and function of the friction reducing agent describe herein. The appropriate concentration for the gelling agent may depend on, inter alia, the composition and molecular weight of the gelling agent, the composition of the friction reducing agent, the TDS of the treatment fluid, and the like, and any combination thereof. For example, the concentration at which a guar-based gelling agent quenches the function of the friction reducing agent may be lower than the concentration for a CMC gelling agent. In some embodiments, the gelling agents may be present in a treatment fluid described herein in an amount ranging from a lower limit of about 0.05%, 0.1%, 0.25%, 1%, or 2.5% by weight of the treatment fluid to an upper limit of about 10%, 8%, 5%, or 2.5% by weight of the treatment fluid, and wherein the concentration may range from any lower limit to any upper limit and encompasses any subset therebetween (e.g., about 0.15% to about 2.5%).

The treatment fluids described herein may be useful in transporting particulates within or into a wellbore and/or subterranean formation. In some embodiments, the treatment fluids described herein may comprise a base fluid, ampholyte polymeric compounds, and a plurality of particulates. It should be understood that the term "particulate," as used in this disclosure, includes all known shapes of materials, including substantially spherical materials, fibrous materials, polygonal materials (such as cubic materials), and any combination thereof.

Suitable particulates for use in conjunction with the fluids sand methods described herein may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the exemplary embodiments described herein. In particular embodiments, preferred mean particulates size distribution ranges are one or more of 6/12, 8/16, 12/20, 16/30, 20/40, 30/50, 40/60, 40/70, or 50/70 mesh.

In some embodiments, the particulates may be present in the treatment fluids in an amount ranging from a lower limit of about 0.5 pounds per gallon ("ppg"), 1 ppg, or 5 ppg by volume of the treatment fluid to an upper limit of about 30 ppg, 20 ppg, or 10 ppg by volume of the treatment fluid, and wherein the amount may range from any lower limit to any upper limit and encompasses any subset therebetween.

In some embodiments, the treatment fluids described herein may optionally further comprise additives. Suitable additives may include, but are not limited to, weighting agents, inert solids, fluid loss control agents, emulsifiers, dispersion aids, corrosion inhibitors, emulsion thinners, emulsion thickeners, surfactants, lost circulation materials, pH control additives, breakers, biocides, crosslinkers, stabilizers, chelating agents, scale inhibitors, gas hydrate inhibitors, mutual solvents, oxidizers, reducers, clay stabilizing agents, and the like, and any combination thereof. One of ordinary skill in the art should understand which additives and at what concentration should be included in the treatment fluid for use in a desired method. By way of nonlimiting example, clay stabilizing agents may be included in the treatment fluids described herein for high-rate water fracturing of water-sensitive clays.

In some embodiments, the treatment fluids comprising the ampholyte polymeric compounds may be useful in a plurality of subterranean operations where friction reduction is desired like stimulation operations (e.g., fracturing treatments, acidizing treatments, or fracture acidizing treatments), and completion operations.

Some embodiments may involve introducing a treatment fluid described herein (e.g., comprising a base fluid, the ampholyte polymeric compounds, optionally foaming agents and gases, optionally gelling agents, optionally particulates, and optionally comprising additives) into a wellbore penetrating a subterranean formation.

In some embodiments, a treatment fluid described herein may be used for a high-rate water fracturing operation, also known as a "slickwater" fracturing operation. As will be appreciated by those of ordinary skill in the art, fracturing fluids used in these operations are generally not gels, though gelling agents may be included at low concentrations (e.g., about 0.5% by weight of the treatment fluid or less). As such, in high-rate water fracturing, fluid velocity rather than viscosity is relied on for formation fracturing, fracture propagation, and proppant transport. The use of the ampholyte polymeric compounds as a friction reducing agent in such operations may advantageously allow for higher fluid flow rates, thereby increasing the efficiency and efficacy of the operation. Typically the treatment fluids utilized in high-rate water fracturing operations have a viscosity of about 0.7 cP to about 10 cP. For the purposes of this disclosure, viscosities are measured at room temperature using a FANN® Model 35 viscometer at 300 rpm with a ⅕ spring.

In some instances, a high-rate water fracturing operation may involve fracturing the formation and forming a particulate pack in a fracture with two different fluids, which may be introduced consecutively without pause (e.g., metering in particulates after fracturing). Some embodiments may involve introducing a first treatment fluid having a viscosity of about 0.7 cP to about 10 cP into a wellbore penetrating a subterranean formation at a rate and a pressure that is at or near the fracture extension pressure of the subterranean formation, so as to create or extend at least one fracture in the subterranean formation; and forming a particulate pack with a second treatment fluid comprising a plurality of particulates, wherein at least one of the first and second treatment fluids comprise ampholyte polymeric compounds described herein. That is, in some instances, the first treatment fluid may comprise a base fluid, ampholyte polymeric compounds, and optionally a gelling agent. In some instances, the second treatment fluid may comprise a base fluid, ampholyte polymeric compounds, a plurality of particulates, and optionally a gelling agent. In some embodiments, both the first and second treatment fluids may comprise ampholyte polymeric compounds and optionally a gelling agent.

In some instances, a high-rate water fracturing operation may involve fracturing the formation while simultaneously forming a particulate pack in a fracture. Some embodiments may involve introducing a treatment fluid comprising particulates (e.g., comprising a base fluid, ampholyte polymeric compounds, a plurality of particulates, and optionally a gelling agent) having a viscosity of about 0.7 cP to about 10 cP into a wellbore penetrating a subterranean formation at a rate and a pressure that is at or near the fracture extension pressure of the subterranean formation, so as to create or extend at least one fracture in the subterranean formation and form a particulate pack in at least a portion of the fracture.

In some embodiments, a treatment fluid described herein may be used for a fracturing operation that relies on the viscosity of the treatment fluid for formation fracturing, fracture propagation, and proppant transport. Some embodiments may involve introducing a first treatment fluid having a viscosity of about 10 cP or greater (e.g., up to 1,000 cP or higher depending on the treatment fluid) into a wellbore penetrating a subterranean formation at a pressure sufficient to create or extend at least one fracture in the subterranean formation; and forming a particulate pack in the fracture with a second treatment fluid comprising a plurality of particulates, wherein at least one of the first and second treatment fluids comprise ampholyte polymeric compounds described herein.

In some instances, the first and/or second treatment fluid may be foamed. In some instances, the first and/or second treatment fluid may be gelled. For example, in some embodiments, the first and/or second treatment fluid may comprise a base fluid, ampholyte polymeric compounds, a gelling agent, and optionally additives, wherein the second treatment fluid further comprises a plurality of particulates. While, in other embodiments, the first treatment fluid may comprise a base fluid, ampholyte polymeric compounds, a foaming agent, a gas, and optionally additives, wherein the second treatment fluid further comprises a plurality of particulates.

Some embodiments (e.g., the fracturing embodiments disclosed herein) may further involve breaking the treatment fluid comprising the ampholyte polymeric compounds. In some instances, breaking may be achieved by partially hydrolyzing the ampholyte polymeric compounds. Partial hydrolysis (or breaking) may be achieved by increasing the temperature, increasing the pH, or both.

In some instances, breaking may be achieved by exposure to the elevated temperatures in the wellbore and/or subterranean formation. For example, the bottom hole circulating temperature may be about 100° F. or greater (e.g., about 100° F. to about 200° F., about 120° F. to about 200° F., or about 150° F. to about 200° F.). The rate of breaking (or partial hydrolysis and contraction of the ampholyte polymeric compounds) may depend on the composition of the ampholyte polymeric compounds, the relative ratios of the monomers of the ampholyte polymeric compounds, the TDS of the treatment fluid, and the like. Therefore, in some instances, the methods may include breaking the treatment fluid comprising the ampholyte polymeric compounds with minimal to no chemical breaker (e.g., less than about 1% of a chemical breaker).

In some instances, breaking may involve increasing the pH of the treatment fluid comprising the ampholyte polymeric compounds. Increasing the pH may be achieved by introducing a suitable breaking fluid or including a suitable breaker in the treatment fluid (e.g., sodium perborate).

In various embodiments, systems configured for delivering the treatment fluids described herein to a downhole location are described. In various embodiments, the systems can comprise a pump fluidly coupled to a tubular, the tubular containing a treatment fluid comprising a base fluid and an ampholyte polymeric compound, wherein the ampholyte polymeric compound comprises at least one nonionic monomer, at least one sulfonic acid-containing monomer, and at least one cationic monomer, and wherein the ampholyte polymeric compound is present at about 0.001 v/v % to about 0.5 v/v % of the treatment fluid.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that includes introducing a treatment fluid into a wellbore penetrating a subterranean formation, wherein the treatment fluid comprises a base fluid and an ampholyte polymeric compound, wherein the ampholyte polymeric compound comprises at least one nonionic monomer, at least one sulfonic acid-containing monomer, and at least one cationic monomer, and wherein the ampholyte polymeric compound is present at about 0.001 v/v % to about 0.5 v/v % of the treatment fluid; and B. a method that includes introducing a treatment fluid having a viscosity of about 0.7 cP to about 10 cP into a wellbore penetrating a subterranean formation at a rate and a pressure that is at or near the fracture extension pressure of the subterranean formation so as to create or extend at least one fracture in the subterranean formation, wherein the treatment fluid comprises a base fluid, an ampholyte polymeric compound, and a plurality of particulates, wherein the ampholyte polymeric compound comprises at least one nonionic monomer, at least one sulfonic acid-containing monomer, and at least one cationic monomer, and wherein the ampholyte polymeric compound is present at about 0.001 v/v % to about 0.5 v/v % of the treatment fluid; and forming a particulate pack comprising the particulates in the fracture; and C. a method that includes introducing a treatment fluid into a wellbore penetrating a subterranean formation at a pressure sufficient to create or extend at least one fracture in the subterranean formation, wherein the ampholyte polymeric compound comprises at least one nonionic monomer, at least one sulfonic acid-containing monomer, and at least one cationic monomer, and wherein the ampholyte polymeric compound is present at about 0.001 v/v % to about 0.5 v/v % of the treatment fluid.

Each of Embodiments A, B, and C may have one or more of the following additional elements in any combination: Element 1: the nonionic monomer being acrylamide; Element 2: the nonionic monomer being about 30% to about 50% by weight of the ampholyte polymeric compound; Element 3: the sulfonic acid-containing monomer being 2-acrylamido-2-methylpropane sulfonic acid or a salt thereof; Element 4: the sulfonic acid-containing monomer being about 5% to about 15% by weight of the ampholyte polymeric compound; Element 5: the sulfonic acid-containing monomer being acryloyloxy ethyl trimethyl ammonium chloride, methacrylamidopropyltrimethyl ammonium chloride, or a combination thereof; Element 6: the cationic monomer being about 40% to about 60% by weight of the ampholyte polymeric compound; Element 7: the method further including partially hydrolyzing the ampholyte polymeric compound; Element 8: the treatment fluid further comprising a plurality of particulates (unless otherwise provided for); Element 9: the base fluid being an oil-in-water emulsion; Element 10: the base fluid being an aqueous fluid; and Element 11: the ampholyte polymeric compound having a molecular weight of about 2,000,000 to about 20,000,000.

By way of non-limiting example, exemplary combinations applicable to Embodiments A, B, and C include: Element 1 in combination with Element 2; Element 3 in combination with Element 4; Element 5 in combination with Element 6; at least two of the foregoing in combination; at least one of Elements 7-11 in combination with the foregoing; and so on.

Further, Embodiment C may have one or more of the following additional elements: Element 12: the method further including forming a particulate pack in the fracture with a second treatment fluid that comprises a second base fluid, a second ampholyte polymeric compound at a viscosifying concentration, and a plurality of particulates; Element 13: Element 12 in combination with the second base fluid being the base fluid and the second ampholyte polymeric compound being the ampholyte polymeric compound; and Element 14: Element 12 or Element 13 in combination with partially hydrolyzing the second ampholyte polymeric compound.

Another embodiment described herein may be a method that includes providing a treatment fluid comprising a base fluid and an ampholyte polymeric compound at about 0.001 v/v % to about 0.5 v/v % of the treatment fluid, the ampholyte polymeric compound comprising acrylamide monomer that is about 30% to about 50% by weight of the ampholyte polymeric compound, 2-acrylamido-2-methylpropane sulfonic acid monomer or a salt thereof that is about 5% to about 15% by weight of the ampholyte polymeric compound, and at least one cationic monomer that is about 40% to about 60% by weight of the ampholyte polymeric compound, wherein the cationic acid-containing monomer is acryloyloxy ethyl trimethyl ammonium chloride, methacrylamidopropyltrimethyl ammonium chloride, or a combination thereof; and introducing the treatment fluid into a wellbore penetrating a subterranean formation.

While compositions and methods are described in terms of "comprising" various components or steps, the compositions and methods can also "consist essentially of" or "consist of" the various components and steps. When "comprising" is used in a claim, it is open-ended.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

The embodiments disclosed herein are illustrative. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

To facilitate a better understanding of the exemplary embodiments described herein, the following examples of preferred or representative embodiments are given. In no way should the following examples be read to limit, or to define, the scope of the exemplary embodiments described herein.

EXAMPLES

Example 1

Samples were prepared with individual friction reducers at a concentration of 1 gallon per thousand gallons (i.e., 0.1% by volume) in water:
(1) a commercially available friction reducing agent containing partially hydrolyzed polyacrylamide;
(2) a multi-component, cationic friction reducing agent
(3) an ampholyte polymeric compound comprising a terpolymer of acrylamide, 2-acrylamido-2-methylpropane sulfonic acid, and acryloyloxy ethyl trimethyl ammonium chloride.

The salinity of the samples (measured as ppm of TDS) was then increased as the percent friction reduction ("% FR") was analyzed by pumping the sample through a test pipe while measuring the pressure drop with a pressure transducer. The % FR is calculated based on the ratio between the measured pressure drop of the sample and the pressure drop of a fresh water control sample at the same tested flow rate and ambient temperature and pressure.

Figure 2:
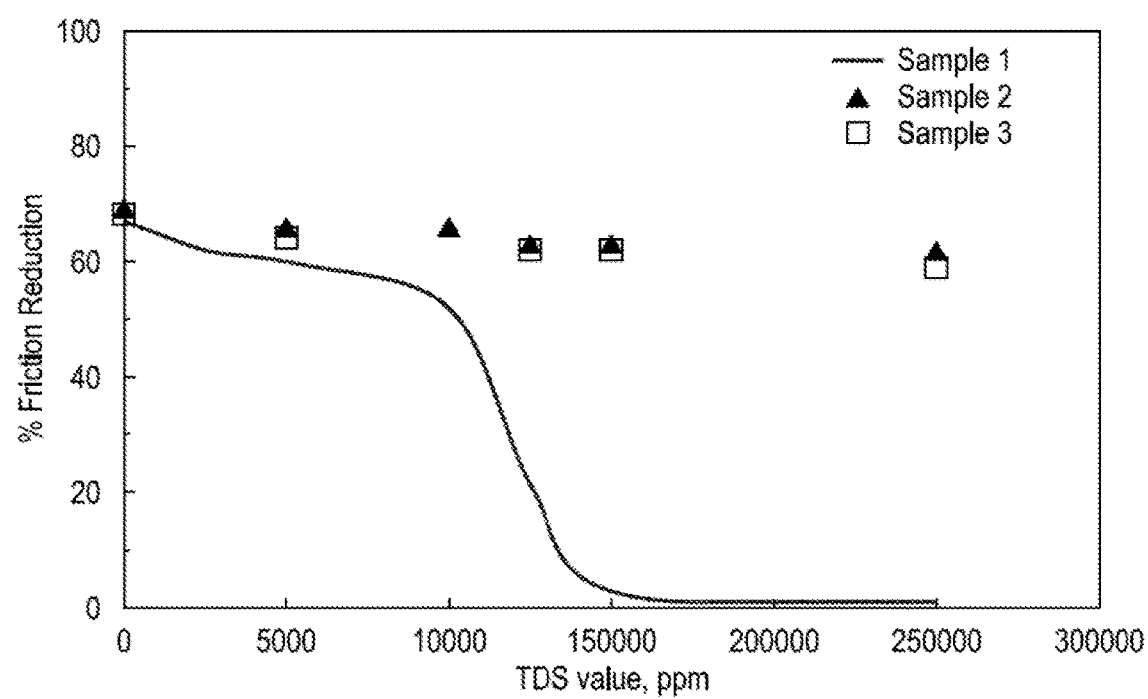
FIG. 2 provides a graph of percent friction reduction at various salinities for three friction reducing additives including one ampholyte polymeric compound.

As shown in FIG. 2, the Sample 1 showed an immediate decline in the % FR with increased salinity and a dramatic drop in % FR to essentially no friction reduction from about 100,000 to about 150,000 ppm TDS. Samples 2 and 3 showed similar performance over the salinity range tested with only about a 5%-10% variations in the % FR from 0 ppm to about 250,000 ppm TDS.

This example demonstrates that the one-component friction reducing agent of an ampholyte polymeric compound outperforms other polymeric friction reducing agents with increased TDS and provides comparable performance to the more complex friction reducing agents tend to be expensive and complicated to implement.

Example 2

Samples of an ampholyte polymeric compound comprising a terpolymer of acrylamide, 2-acrylamido-2-methylpropane sulfonic acid, and acryloyloxy ethyl trimethyl ammonium chloride in water were analyzed for degradation rates by analyzing the viscosity of the fluid over time at various temperatures:
(1) room temperature,
(2) ramp to 150° F., and
(3) ramp to 190° F.

Figure 3:
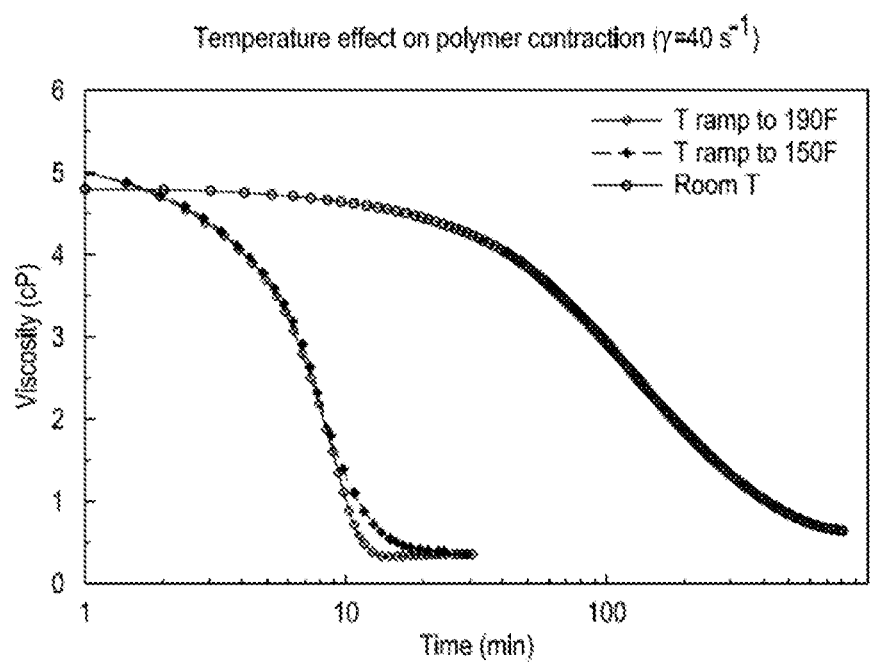
FIG. 3 provides a graph of viscosity measurements over time at various temperatures for a fluid comprising an ampholyte polymeric compound.

As shown in FIG. 3, the viscosity of the room temperature sample decreased from about 4.75 cP to about 1 cP over about 6 hours while the 150° F. sample decreased from about 5 cP to about 0.4 cP over about 25 minutes and the 190° F. sample decreased from about 5 cP to about 0.4 cP over about 15 minutes. Reduction in viscosity to such levels indicates that the polymer is partially hydrolyzed and contracted. As shown, the hydrolysis is temperature dependent indicating that in some instances the native temperature of the subterranean formation may be such that an ampholyte polymeric compound may be capable of breaking with minimal to no additional breaker.

Example 3

Figure 4:
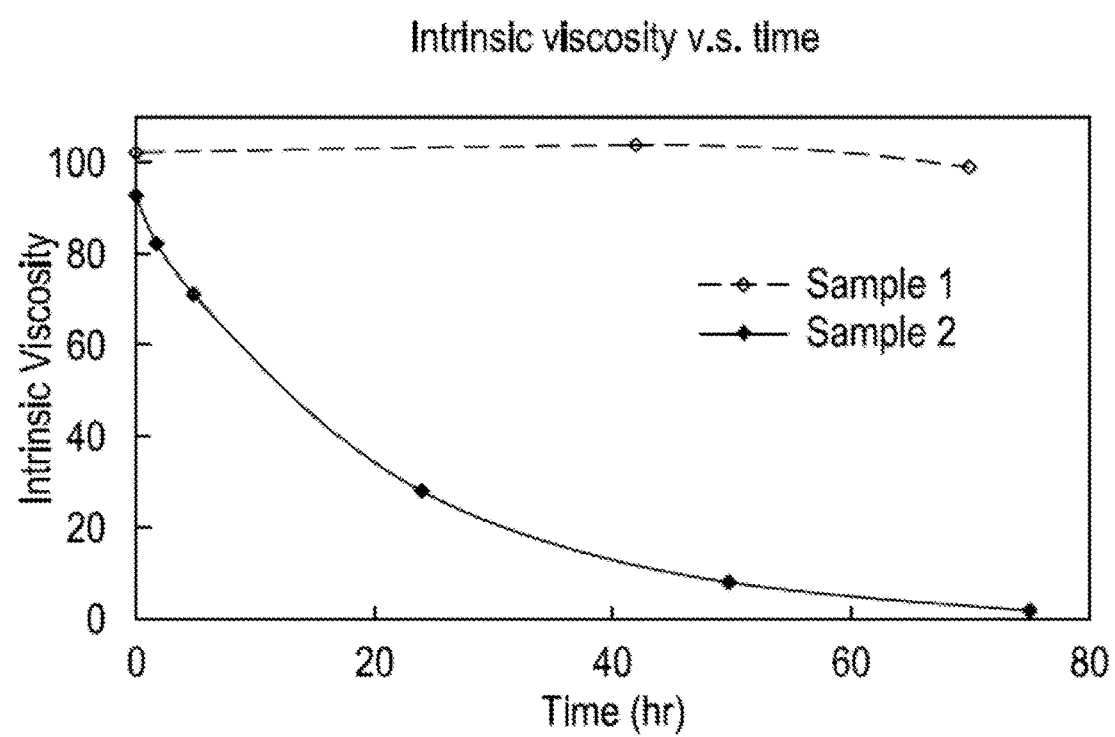
FIG. 4 provides a graph comparing the intrinsic viscosity over time for a fluid comprising an ampholyte polymeric compound and a fluid comprising a traditional friction reducing agent.

Samples were prepared with (1) partially hydrolyzed polyacrylamide in water (2) an ampholyte polymeric compound comprising a terpolymer of acrylamide, 2-acrylamido-2-methylpropane sulfonic acid, and acryloyloxy ethyl trimethyl ammonium chloride in water. The concentration of each of the polymers was at infinite dilution, which is a term known in the art that one of ordinary skill in the art can determine. The intrinsic viscosity of the samples were measured over about 75 hours. As illustrated in FIG. 4, the ampholyte polymeric compound sample reduced in intrinsic viscosity from about 95 dL/g to about 2 dL/g, while the polyacrylamide sample had a relatively steady intrinsic viscosity of about 100 dL/g over the 75 hour time frame. This demonstrates that the ampholyte polymeric compounds may be capable of breaking over time without the use of chemical breakers due, at least in part, to the partial hydrolysis of the ampholyte polymeric compound (e.g., the acryloyloxy ethyl trimethyl ammonium chloride to acrylic acid).

Example 4

Figure 5:
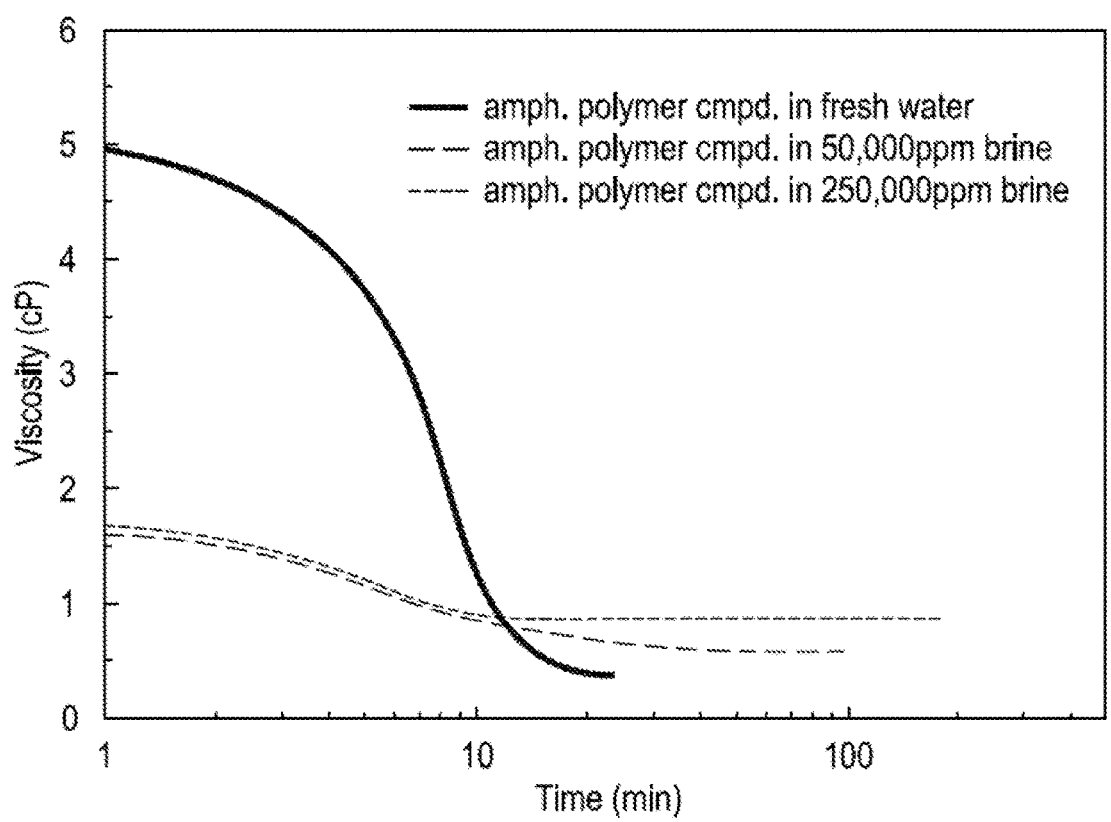
FIG. 5 provides a graph of viscosity measurements over time at various TDS concentrations for fluids comprising an ampholyte polymeric compound.

Samples were prepared with an ampholyte polymeric compound comprising a terpolymer of acrylamide, 2-acrylamido-2-methylpropane sulfonic acid, and acryloyloxy ethyl trimethyl ammonium chloride at 0.1 vol % in (1) water, (2) 50,000 ppm brine, and (3) 250,000 ppm brine. The samples were heated to 150° F., and the viscosity of each sample was analyzed at a shear rate of 40 $s^{-1}$. FIG. 5 illustrates that sample in water achieved the highest initial viscosity, while both of the brine samples achieved about ⅓ the initial viscosity as the water sample. However, over time, the higher the TDS of the sample the less reduction in the viscosity (i.e., less hydrolysis and contraction of the ampholyte polymeric compound).

Example 5

Samples were prepared with (1) 0.1 vol % polyacrylamide, (2) 0.1 vol % polyacrylamide and 1 lb/1,000 gal of a chemical breaker, and (3) 0.1 vol % of an ampholyte polymeric compound comprising a terpolymer of acrylamide, 2-acrylamido-2-methylpropane sulfonic acid, and acryloyloxy ethyl trimethyl ammonium chloride in water. Samples were run through various core/sand pack samples to determine the regain permeability of the core/sand pack samples after treatment.

In the regain permeability tests, the initial permeability was measured by flowing 7% KCl through the core/sand pack sample. Then, the samples were pumped through the core/sand pack sample at a rate of five pore volumes. The treated core/sand pack sample was shut-in overnight at 150° F. The permeability was once again tested by flowing 7% KCl through the core/sand pack sample. Table 1 provides the initial permeability and percent of permeability regained.

TABLE 1

| Fluid Sample | Core/Sand Pack | Initial Permeability | Regain Permeability |
|---|---|---|---|
| (2) | 100 mesh sand pack | 1.5 D | 96% |
| (3) | 100 mesh sand pack | 1.6 D | 98% |
| (1) | Berea core | 91 mD | 29% |
| (2) | Berea core | 106 mD | 83% |
| (3) | Berea core | 77 mD | 80% |

TABLE 1-continued

| Fluid Sample | Core/Sand Pack | Initial Permeability | Regain Permeability |
|---|---|---|---|
| (2) | Nugget | 2.5 mD | 54% |
| (3) | Nugget | 1.8 mD | 61% |

This example demonstrates that the ampholyte polymeric compound, with no additional chemical breaker, provides for similar or better regain in permeability to a traditional friction reducer with a chemical breaker.

Therefore, the exemplary embodiments described herein are well adapted to attain the ends and advantages mentioned as well as those that are inherent therein. The particular embodiments disclosed above are illustrative only, as the exemplary embodiments described herein exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid comprising a base fluid and an ampholyte polymeric compound, the ampholyte polymeric compound comprising:
about 30-50% by weight of at least one nonionic monomer, wherein the at least one nonionic monomer is acrylamide;
about 5-15% by weight of at least one sulfonic acid-containing monomer, wherein the at least one sulfonic acid-containing monomer is 2-acrylamido-2-methylpropane sulfonic acid or a salt thereof; and
about 40-60% by weight of at least one cationic monomer, wherein the at least one cationic monomer is acryloyloxy ethyl trimethyl ammonium chloride, methacrylamidopropyltrimethyl ammonium chloride, or a combination thereof;
wherein the ampholyte polymeric compound is present at a friction reducing concentration of about 0.001 v/v % to about 0.5 v/v % of the treatment fluid; and
wherein the treatment fluid comprises 100,000 to 250,000 ppm of total dissolved solids; and
reducing friction between the fluid and the wellbore using the treatment fluid in a wellbore penetrating a subterranean formation;
wherein the treatment fluid has less than about a 10% variation in friction reduction in a salinity range from about 100,000 to about 250,000 ppm of total dissolved solids.

2. The method of claim 1, wherein the at least one nonionic monomer is about 35% to about 45% by weight of the ampholyte polymeric compound.

3. The method of claim 1, wherein the at least one sulfonic acid-containing monomer is about 8% to about 12% by weight of the ampholyte polymeric compound.

4. The method of claim 1, wherein the at least one cationic monomer is about 45% to about 55% by weight of the ampholyte polymeric compound.

5. The method of claim 1 further comprising:
partially hydrolyzing the ampholyte polymeric compound.

6. The method of claim 1, wherein the treatment fluid further comprises a plurality of particulates.

7. The method of claim 6, wherein the treatment fluid has a viscosity of about 0.7 cP to about 10 cP; wherein introducing the treatment fluid is at a rate and a pressure that is at or near the fracture extension pressure of the subterranean formation so as to create or extend at least one fracture in the subterranean formation; and wherein the method further comprises forming a particulate pack comprising the particulates in the fracture.

8. A method comprising:
reducing friction between the fluid and the wellbore while fracturing by introducing a treatment fluid into a wellbore penetrating a subterranean formation at a pressure sufficient to create or extend at least one fracture in the subterranean formation;
wherein the treatment fluid comprises a base fluid, an ampholyte polymeric compound, and a gelling agent;
wherein the ampholyte polymeric compound consists of:
about 30-50% by weight of at least one nonionic monomer, wherein the at least one nonionic monomer is acrylamide;
about 5-15% by weight of at least one sulfonic acid-containing monomer, wherein the at least one sulfonic acid-containing monomer is 2-acrylamido-2-methylpropane sulfonic acid or a salt thereof; and
about 40-60% by weight of at least one cationic monomer, wherein the at least one cationic monomer is acryloyloxy ethyl trimethyl ammonium chloride, methacrylamidopropyltrimethyl ammonium chloride, or a combination thereof;
wherein the ampholyte polymeric compound is present at a friction reducing concentration of about 0.001 v/v % to about 0.5 v/v % of the treatment fluid;
wherein the treatment fluid comprises 100,000 to 250,000 ppm of total dissolved solids; and wherein the treatment fluid has less than about a 10% variation in friction reduction in a salinity range from about 100,000 to about 250,000 ppm of total dissolved solids.

9. The method of claim 8 further comprising:
providing a second treatment fluid that comprises a second base fluid, a second ampholyte polymeric compound at a friction reducing concentration, a gas, a foaming agent, and a plurality of particulates, and
placing the second treatment fluid into the at least one fracture to form a particulate pack in the fracture.

10. The method of claim 9, wherein the second base fluid is the base fluid and the second ampholyte polymeric compound is the ampholyte polymeric compound.

11. The method of claim 8, wherein the at least one nonionic monomer is about 35% to about 45% by weight of the ampholyte polymeric compound.

12. The method of claim 8, wherein the at least one sulfonic acid-containing monomer is about 8% to about 12% by weight of the ampholyte polymeric compound.

13. The method of claim 8, wherein the at least one cationic monomer is about 45% to about 55% by weight of the ampholyte polymeric compound.

14. A method comprising:
providing a treatment fluid having a viscosity between about 0.7 cP and about 10 cP and comprising:
a base fluid having from 100,000 to 250,000 ppm of total dissolved solids, and
an ampholyte polymeric compound present at a friction reducing concentration of about 0.001 v/v % to about 0.5 v/v % of the treatment fluid, the ampholyte polymeric compound consisting of:
acrylamide monomer that is about 30% to about 50% by weight of the ampholyte polymeric compound,
2-acrylamido-2-methylpropane sulfonic acid monomer or a salt thereof that is about 5% to about 15% by weight of the ampholyte polymeric compound, and
acryloyloxy ethyl trimethyl ammonium chloride monomer that is about 40% to about 60% by weight of the ampholyte polymeric compound; and
introducing the treatment fluid into a wellbore penetrating a subterranean formation at a rate sufficient to create or extend a fracture within the subterranean formation, and
wherein the regain permeability after the treatment fluid has been in the subterranean formation is 50% or greater; and
wherein the treatment fluid has less than about a 10% variation in friction reduction in a salinity range from about 100,000 to about 250,000 ppm of total dissolved solids.

* * * * *